Figure 1:
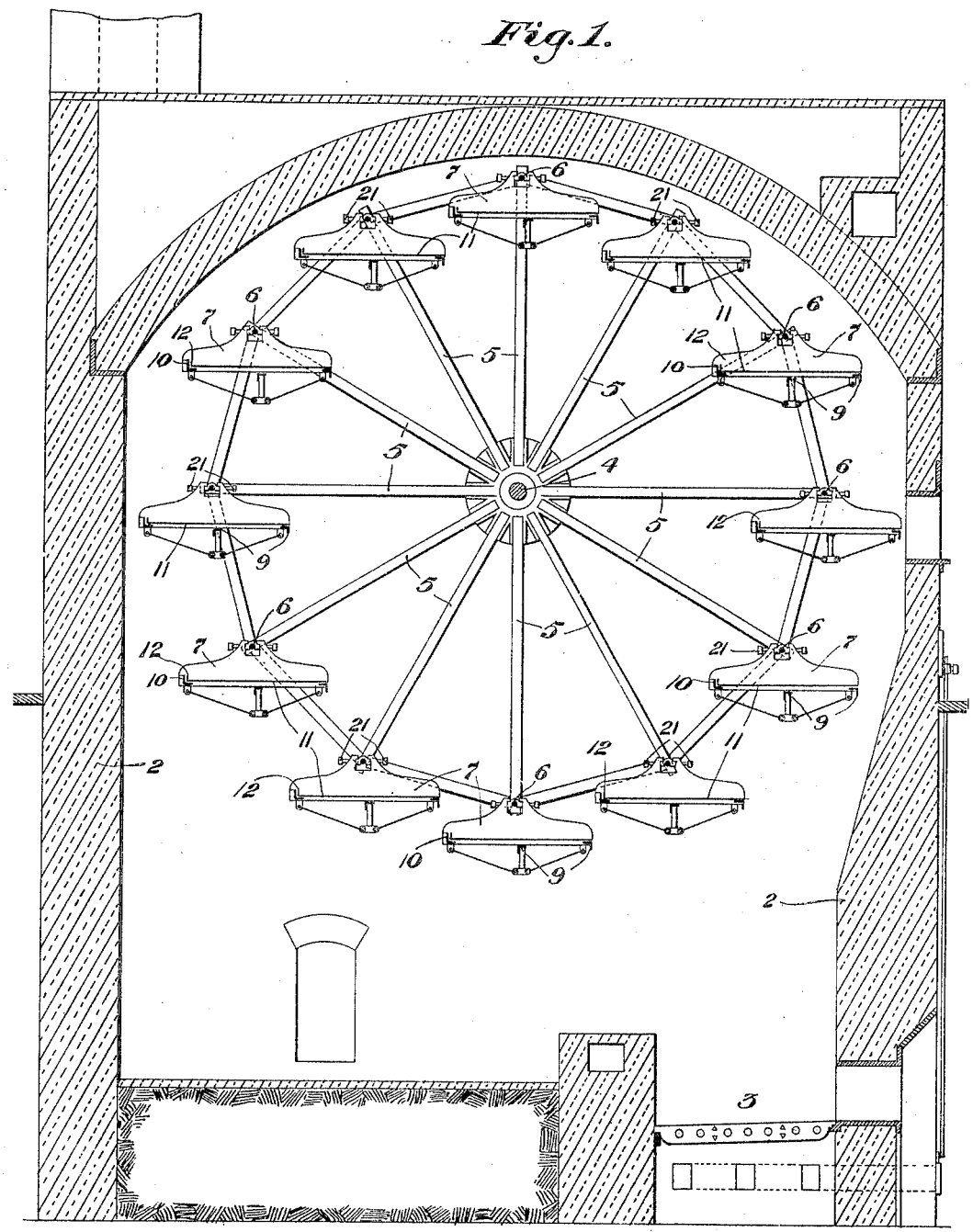

No. 804,622. PATENTED NOV. 14, 1905.
J. W. RUGER.
BAKING APPARATUS.
APPLICATION FILED JULY 27, 1904.

2 SHEETS—SHEET 1.

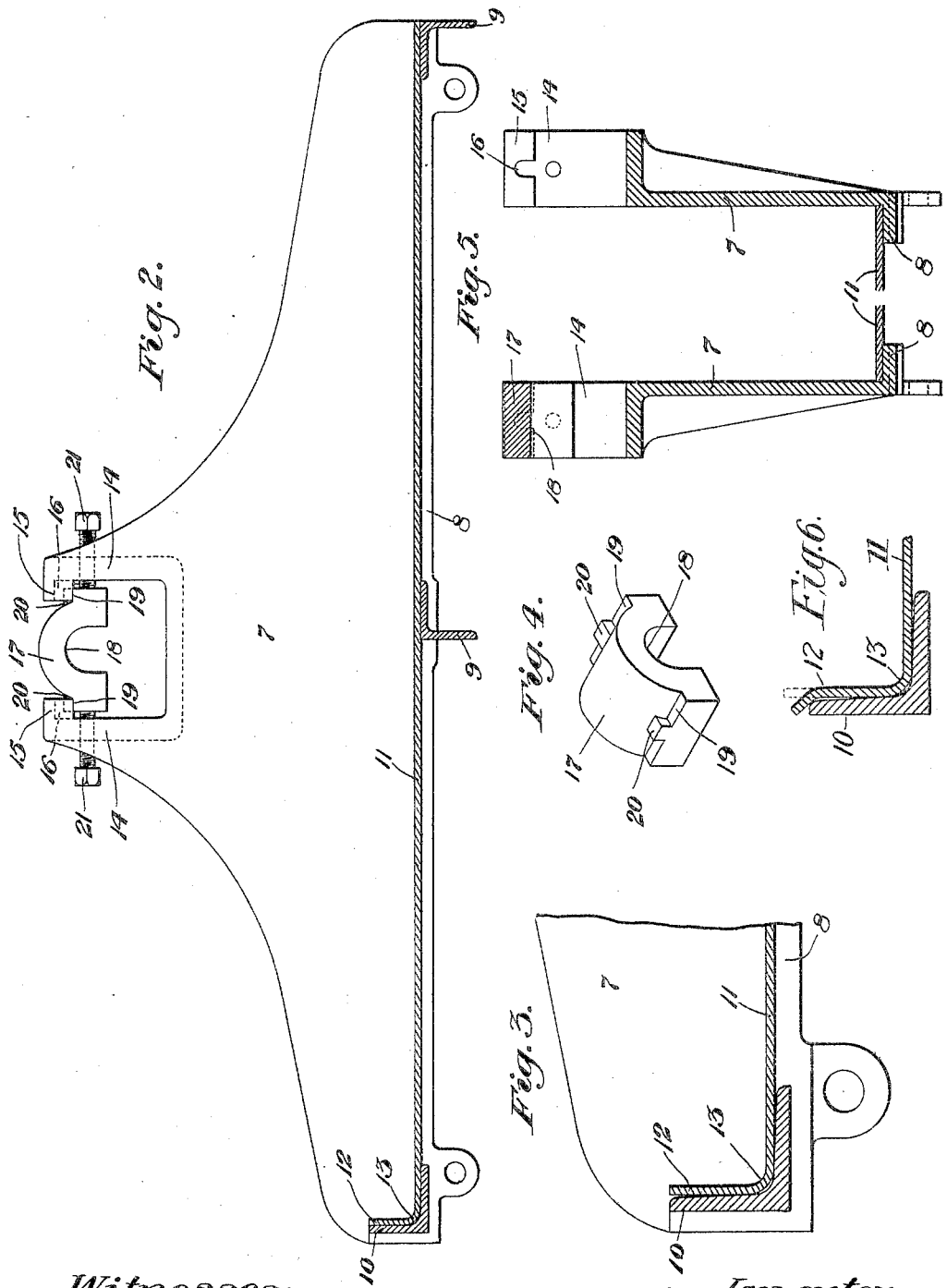

UNITED STATES PATENT OFFICE.

JAMES W. RUGER, OF PITTSBURG, PENNSYLVANIA, ASSIGNOR TO BAIR & GAZZAM MANUFACTURING COMPANY, OF PITTSBURG, PENNSYLVANIA, A CORPORATION OF PENNSYLVANIA.

BAKING APPARATUS.

No. 804,622.  Specification of Letters Patent.  Patented Nov. 14, 1905.

Application filed July 27, 1904. Serial No. 218,324.

*To all whom it may concern:*

Be it known that I, JAMES W. RUGER, a citizen of the United States, residing at Pittsburg, in the county of Allegheny and State of Pennsylvania, have invented certain new and useful Improvements in Baking Apparatus, of which the following is a specification, reference being had therein to the accompanying drawings, forming part of this specification, in which—

Figure 1 is a vertical cross-section through a bake-oven embodying my improved apparatus. Fig. 2 is an enlarged cross-sectional view of one of the bake-pans. Fig. 3 is a further enlarged detail view showing the back wall of the pan. Fig. 4 is a detail view of one of the shaft-bearings. Fig. 5 is a detail vertical sectional view through the oppositely-disposed shelf-hangers, the pan being partly broken away and the shaft and one of the boxes being omitted. Fig. 6 is a detail view similar to Fig. 3, showing a modified construction.

My invention refers to improvements in baking apparatus, and relates particularly to the construction of the bake-pans of a revolving or other type of installation adapted to the baking of crackers, cakes, &c. Heretofore in apparatus of this kind the pans have been made of flat sections of sheet metal mounted upon strengthening and supporting frames, and ordinarily a back edge or wall is provided by a separate piece or by the leg of an angle member projecting upwardly above the level of the pan for the purpose of confining the contents of the pan at the back and preventing overflow. Such constructions have proved unsatisfactory in practice by reason of the separation of the back wall from the pan due to warpage under the effect of the heat of the oven, thereby producing distortion, separation of the parts, and frequently producing a crack or chasm between the back edge of the pan and the back wall. A serious objection to such pans is that the discharging-hoe used to withdraw the baked contents from the pan is liable to become caught in the crack at the back or fragments of dough also become lodged and remain until charred and frequently become ignited. These pieces, either already afire or very highly heated, become mixed with the baked crackers, &c., and when packed with them, also in a highly-heated condition, are apt to produce or cause combustion, setting fire to the contents or packing-box, and are a frequent cause of trouble and sometimes of considerable loss from fire. A further objection is that the crack between the back edge of the pan and the back wall becomes filled with burned dough, impurities from the fire, and dirt from other causes, while any dirt upon the surface of the pan is forced into the crack during the swabbing of the pan. This results in soiling or discoloring of the crackers, &c., while the presence of the crack causes the edge of the crackers to bend down and become lodged in contact with such accumulation.

My invention is designed to obviate these objections and produce a pan which will retain its original form at all times.

A further object is to provide improved adjustable bearings for the pan capable of easy installation and removal and accurate adjustment.

Referring now to the drawings, 2 represents the walls of a bake-oven provided with the usual fireplace 3 and the various other necessary accompaniments of such structures. Rotatably mounted in the interior of the oven is a shaft 4, provided with a series of radial arms 5 at each end, between which at their extremities extend cross shafts or bars 6, upon which are mounted the various bake-pans by their frames and bearings.

The frames of the pans consist of end plates or shelf-hangers 7, provided with inwardly-turned supporting-flanges 8 at the bottom, with which are connected the cross-bearing slats or bars 9 of angle or other suitable form. The bar at the back end preferably consists of an angle, with one flange 10 extending upwardly, as shown, thus providing a substantial backing for the back upwardly-turned wall of the pan. The pan 11 consists of sheet metal laid over the bars 9 and upon flanges 8, to which it is secured by bolts or rivets, and is turned up at the back, as at 12, at about right angles, the bent portion being freely rounded at the corner 13, the turned-up lip merely resting against the flange 10. In this manner it will be seen that the pan is integral throughout its floor and back, obviating the objections noted and offering a continuous smooth surface for the purposes in view. If desired, also the back 12 of the pan may be extended above the upper edge of angle-flange 10 or bent outwardly at an angle, as shown in dotted and full lines, respectively, in Fig. 6, as it is not essential that it coincide with the edge in the manner shown.

The upper portions of the end plates 7 are provided with oppositely-located housing-lugs 14 14 at each side of a central cavity and have inwardly-turned lips 15 15, provided with sockets 16. Between these lugs are mounted the shaft-bearings 17, provided with semicylindrical bearing-recesses 18 underneath, upwardly arched, and having terminal lips 19 19, adapted to bear upwardly against the bearing-lips 15, with projections 20 on the upper side of lips 19, engaging sockets 16 at each side. By this interengagement the shelf-hangers and their bearings are locked together against relative end movement when assembled. The bearings fit loosely within the space between the housing-lugs 14 with sufficient play to compensate for overhang of the pan at each side by adjustment of the bearing. For this purpose set-screws 21 21 are mounted in the sides of the housing, as shown, by which the bearings may be accurately adjusted to one side or the other, so as to secure perfect balance of the pan by locating its bearing coincident with its center of gravity. The bearings are very readily removed by merely elevating the pan and shelf-hangers sufficiently to allow the bearings to fall until the projections 20 are free of sockets 16, when they may be taken out or replaced with ease.

The advantages of my invention will be readily appreciated by all those familiar with apparatus of this class. It is very strong and durable, simple in construction, and not liable to get out of order, while its practical use in actual service has demonstrated its efficiency.

What I claim is—

1. A bake-pan consisting of a supporting-frame provided with cross supporting-bars and an upwardly-extending back flange, with a sheet-metal bottom supported upon the frame and provided with an integral upwardly-turned back resting against the back flange, and extending upwardly therefrom, substantially as set forth.

2. A bake-pan consisting of a supporting-frame provided with cross supporting-bars and an upwardly-extending back flange, with a sheet-metal bottom supported upon the frame and provided with an integral upwardly-turned back resting against the back flange, and extending upwardly and backwardly therefrom, substantially as set forth.

3. In a bake-pan, the combination with a back-supporting angle-bar having an upwardly-turned leg, of a bottom pan resting upon the other leg of the angle and bent up in front of said upwardly-turned leg, the bent portion being rounded, substantially as set forth.

4. A bake-pan provided with shelf-hangers, and laterally-adjustable bearings mounted therein, substantially as set forth.

5. A bake-pan provided with shelf-hangers having lateral housing-lugs provided with inwardly-turned lips, with shaft-bearings engaging said lugs, substantially as set forth.

6. A bake-pan provided with shelf-hangers having lateral housing-lugs provided with inwardly-turned lips, with shaft-bearings engaging said lugs, and means for adjusting said bearings laterally, substantially as set forth.

7. A bake-pan provided with shelf-hangers, laterally-adjustable shaft-bearings mounted therein, and adjusting set-screws mounted in the sides of the hangers and adapted to bear against the ends of the bearings, substantially as set forth.

8. In combination with the pan-supporting shaft of a revolving frame, a bake-pan provided with shelf-hangers, vertically and laterally movable shaft-bearings mounted therein, and adjusting set-screws mounted in the shelf-hangers adapted to bear against the bearings, substantially as set forth.

9. The combination with upwardly and inwardly extending lugs of a shelf-hanger provided with sockets and adjusting-screws, of shaft-bearings provided with supporting extremities and centering-lugs adapted to engage said lugs and sockets, substantially as set forth.

10. The combination with a pan-supporting shaft, of bearings mounted on the shaft, shelf-hangers depending therefrom, and means for adjusting the shelf-hangers with relation to the bearings, substantially as set forth.

11. The combination with a pan-supporting shaft, of bearings mounted on the shaft, shelf-hangers depending therefrom, means for adjusting the shelf-hangers with relation to the bearings, supporting-bars connecting the shelf-hangers, and a pan supported upon said bars and provided with an upwardly-turned back, substantially as set forth.

12. The combination with a pan-supporting shaft, of bearings mounted on the shaft, shelf-hangers depending therefrom, means for adjusting the shelf-hangers with relation to the bearings, supporting-bars connecting the shelf-hangers, and a pan supported upon said bars and provided with an upwardly-turned back in bearing engagement with one of the supporting-bars, substantially as set forth.

In testimony whereof I affix my signature in presence of two witnesses.

JAMES W. RUGER.

Witnesses:
JAMES McC. MILLER,
C. M. CLARKE.